Dec. 10, 1935.  F. W. BURGER  2,023,404
RIM MOUNTING
Filed Dec. 26, 1930  2 Sheets-Sheet 1
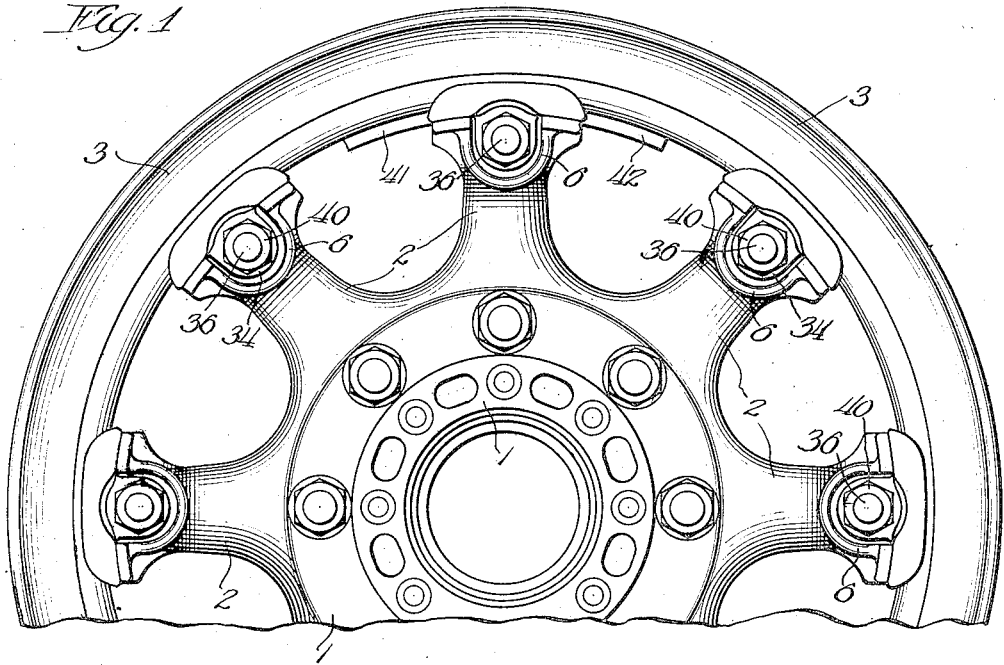
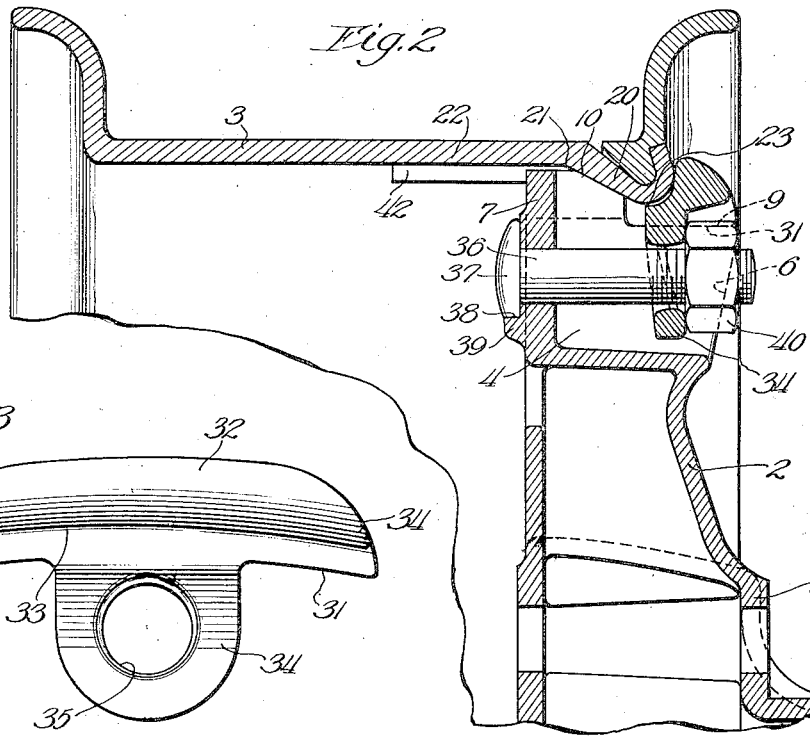
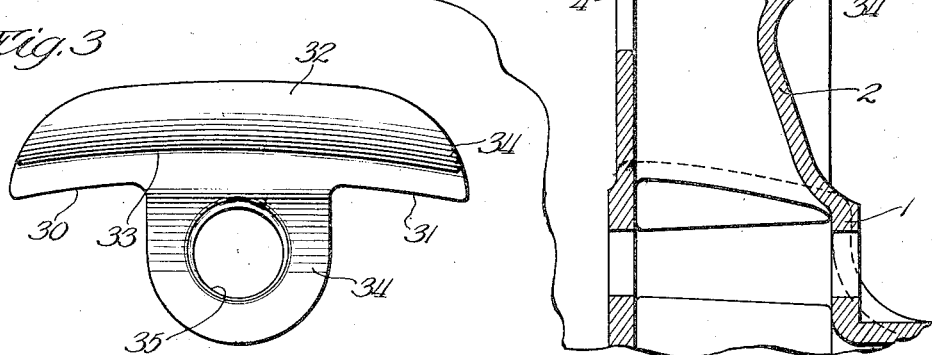
Inventor:
Frederick W. Burger
By Brown Jackson Forteser & Brenner
Attys.

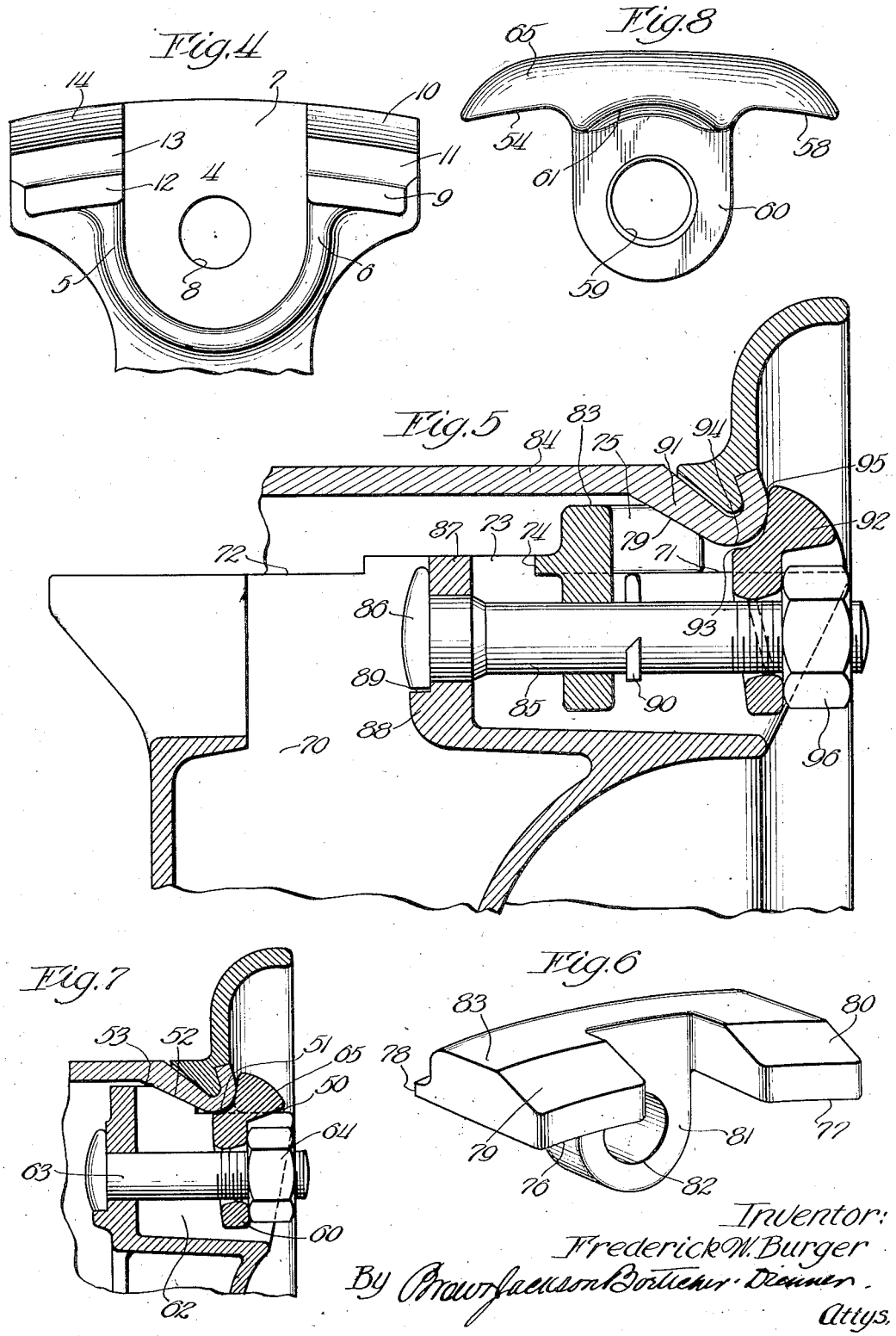

Patented Dec. 10, 1935

2,023,404

UNITED STATES PATENT OFFICE 2,023,404

RIM MOUNTING

Frederick W. Burger, Niles, Mich., assignor to Clark Equipment Company, Buchanan, Mich., a corporation of Michigan Application December 26, 1930, Serial No. 504,714

35 Claims. (Cl. 301—12)

This invention relates to rim mountings.

Wheels having demountable tire carrying rims are commonly used in the automotive art. Certain of these wheels, particularly those used for heavy trucks and buses, and the like, are composed of spiders or wheel bodies having hubs and spokes integrally formed. This type of wheel ordinarily is a felloeless wheel, that is, the radially outward ends of the spokes are not connected by a rim.

The tire carrying rims mounted upon wheels of this type are usually mounted by clamping members which engage the gutter of the rim, these members wedging that gutter tight against the spoke ends to align and securely hold the rim upon the wheel body.

With the prior art devices, of which I am aware, considerable care must be taken to insure drawing up the clamping lugs evenly around the wheel if the rim is to be positioned on the spider or wheel body in such a manner that its axis coincides with the axis of the hub. Obviously, if the rim is not so positioned the tire will not run true and it will therefore wear excessively in ordinary service.

My invention provides a new and improved clamping arrangement for attaching rims to wheels of this kind, an arrangement which permits accurately and quickly centering the rim with respect to the wheel within commercial limits, without special thought or care on the part of the operator.

To accomplish this end, in the preferred embodiment of my invention, I provide the end of the spokes with flat or arcuate shoulders whose working surfaces are disposed on a cylinder whose axis coincides with the axis of the wheel. Spaced laterally outwardly of these shoulders are tapered clamping surfaces against which the gutter of the rim is adapted to register. The clamping lugs are provided with seating surfaces which engage the shoulders to securely seat the lugs upon the spider, and are also provided with cylindrical lips which fit inside of the gutter of the rim and preliminarily align it with respect to the wheel. The lugs are also provided with planar clamping surfaces which engage the outward edge of the rim and press it firmly against the beveled seating surfaces on the spokes, this engagement of the end of the tapered gutter of the rim with the tapered spoke ends accurately aligning the rim with respect to the spokes. Rims mounted in this manner run true with respect to the axis of the wheel within very close limits.

In certain instances it may be advantageous to provide removable clamping bevels, and as a further object of my invention I have provided auxiliary clamping members which are removable from the wheel body. These clamping bevels are formed similarly to the clamping lugs and are provided with accurately machined surfaces to engage the shoulder on the wheel and the tapered gutter of the rim. The clamping lug used with this type of clamping member is the same as before.

The use of removable clamping bevels on a felloeless wheel is particularly advantageous for the reason that it permits clamping of rims having gutters of different taper angles to the same spider by simply providing these auxiliary clamping members with the proper beveled surface to engage the particular gutter in question.

These removable clamping bevels are further advantageous in that they enable one to attach a single rim to a spider which is designed to carry two tires, that is, a dual wheel. By employing the removable clamping bevel a single tire may be mounted upon this type of wheel within the teachings of my invention.

In certain instances it may be advantageous to provide shoulders on the spoke ends which will themselves preliminarily align the rim with respect to the spider, providing also the inclined clamping surfaces by which the final alignment and clamping of the rim is accomplished. To this end I have provided, as a modified form of my invention, a spider having cylindrical shoulders disposed at the ends of its spoke, those shoulders being positioned radially outward from the axis of the spider a distance that is slightly less than the innermost circumference of the gutter of the rim that is to be mounted upon the wheel. In this embodiment of my invention, when the rim is placed over the spider, its gutter strikes against the shoulders and preliminarily aligns it with respect to the spider. The clamping lugs used in this embodiment of my invention need be provided only with planar engaging faces which press against the outer edge of the gutter of the rim and with seating faces which press against the shoulders, these lugs being drawn up by the usual through bolts to press the gutter against the inclined clamping surface on the end of the spoke and thereby definitely align and seat it upon the spider.

Further objects of my invention will be apparent from the detailed description, reference being had to the accompanying drawings in which a preferred embodiment of my invention is shown by way of example.

In the drawings:

Figure 1 is a fragmentary elevational view of a wheel with a rim attached in accordance with the teachings of my invention;

Figure 2 is a cross sectional view through one of the spokes of the wheel shown in Figure 1;

Figure 3 is an elevational view of the clamping lug;

Figure 4 is a detailed elevationl view of the spoke end;

Figure 5 is a cross sectional view through a spoke showing a modified form of my invention;

Figure 6 is a perspective view of the clamping bevel used in the embodiment shown in Figure 5;

Figure 7 is a fragmentary cross sectional view through a spoke showing another embodiment of my invention; and Figure 8 is an elevational view of the clamping lug employed in the embodiment shown in Figure 7.

Referring now to the drawings in more detail, the spider comprises a hub 1 from which are radiated a plurality of spokes 2 each of which terminates in a shouldered end upon which the rim 3 is mounted. The end of the spoke is provided with a transverse socket 4 formed between side walls 5 and 6, and closed at one end by the wall 7 which is located in the plane of the spider. This wall 7 is pierced with a hole 8 through which the clamping bolt is projected.

As will be seen in Figures 2 and 4, the wall 6 is provided with a flat shoulder 9 which lies on a cylinder whose center coincides with the axis of the spider. This shoulder 9 is flat and broad and provides a seat for the clamping lug, as will presently appear. Rising out of this shoulder is a sub-shoulder or clamping member or bevel 10, the angular face of which is shaped to register with the gutter of the rim 3 that is to be mounted upon the wheel. The clamping lug 10 is offset radially from the shoulder 9, this offset forming a sub-shoulder 11 which is disposed parallel to the plane of the spider.

The wall 5 of the spoke is similarly provided with a shoulder 12, sub-shoulder 13 and clamping bevel 14.

The rim 3 that is to be mounted upon the spider is provided with a gutter 20 whose angular face 21 registers with the clamping bevel 10 of the spoke end. This gutter projects radially inward from the web 22 of the rim, and the innermost circumference 23 of this gutter is disposed radially from the center of the rim a distance greater than the radial distance of the shoulders 9 and 12 from the axis of the spider. The web 22 is of a greater diameter than the diameter of the circle upon which the outward end of the clamping bevels 10 and 14 rest, so that when the rim is placed upon the spider the web will clear the end of the spoke and the gutter will clear the shoulders 9 and 12, these clearances being relatively large, preferably of the order of about one-fourth of an inch. This clearance insures that the rim may be readily placed on and removed from the spider.

The clamping lug employed to lock the rim upon the spider comprises a crescent shaped lug having seating surfaces 30 and 31 which are formed as sections of a cylinder whose radius corresponds to the radius of the shoulders 9 and 12 on the spoke. The lug is also provided with a planar clamping surface 32 and a cylindrical lining surface 33, these two being joined by a fillet 34. The clamping surface 32 is planar and is disposed so that when the lug is preferably seated upon the shoulders upon the spoke end, this surface will be in a plane parallel to the plane of the spider. The lug is also provided with an ear 34 which projects out of the arcuate surfaces 30 and 31 and is arranged to be disposed in the socket 4 in the end of the spoke. This ear is pierced by a hole 35 through which the clamping bolt extends.

The clamping bolt 36 is provided with an oval head 37 which is cut away at 38 to register with a shoulder 39 projecting from the wall 7 to prevent the bolt turning. The bolt is threaded and provided with a nut 40 by which the clamping lug is drawn upon the bolt.

The operation of the clamping arrangement is as follows:

When the rim is slipped over the spider it will rest out of line with the spider, that is, the axis of the rim will not coincide with the axis of the spider. As the clamping lugs are drawn up the cylindrical aligning surface registers with the innermost edge 23 of the gutter of the rim and brings the rim into approximate alignment with the spider. As the nut is further tightened, the planar surface 32 of the lug bears against the outside surface of the gutter of the rim and forces the rim inward on the spider so that the beveled surface 21 of the gutter registers with the clamping bevel 10 on the spoke end. This aligns the wheel definitely with respect to the spider even though the tension maintained on the various bolts around the spider is not exactly uniform. As the bevel of the gutter engages the beveled clamping surface 10 the rim is lifted so that its innermost surface 23 no longer engages the cylindrical surface 33 of the lug, and the bevel is therefore solely relied upon for aligning and holding the rim. When the nuts 40 are tight, the gutter is securely clamped between the surface 32 on the lug and the beveled surface 10 on the spoke and on the rim thereby securely fastened to the spider.

The lips or aligning surfaces 33 serve, in connection with the seating of the lug surfaces 30—31 on the shoulders 9 of the wheel body laterally outwardly of the rim contacting lug portions 32 and after the rim has been forced onto the clamping bevels, to prevent the lugs from turning up as the nuts 40 are tightened by extending under the gutter of the rim and preventing the lug from rocking about the heel or point of contact between the laterally outer portion of the lug and the shoulders on which it seats when the clamping bolt or other means is tightened. Thus the reactions developed by tightening the clamping nuts are taken by the seating surfaces on the lugs and the shoulders on the wheel body, while the clamping bolts 36 are entirely relieved of all twisting, tilting, cocking and side strains and the like. The cylindrical surfaces or aligning lips 33 in this form therefore serve a dual function, that of centering the rim and that of preventing the lug from overturning.

It is to be understood, however, that the function of preventing the lugs from overturning is not only to prevent twisting the clamping bolt. While this result is important it is equally important, if not more so, that the lug be moved against the rim in an approximately axial direction and that the lug shall not be twisted or cramped against either the rim or the wheel body. If the lug slides up against the rim and does not become cramped against it or against the spoke end or felly, obviously much better action in attaching and releasing the rim is secured, for if the lug becomes tilted or cocked beyond a critical angle there is considerable likelihood that the lug will become self-locked, that is, the lug will lie at such an angle relative to the rim and to the wheel body that further tightening of the clamping bolt serves only to cramp the lug tighter between the rim and wheel without shifting it relative to either the rim or the wheel body. By limiting the tilting of the lug to less than this critical angle, which is accomplished in the preferred embodiment by having the lips 33 extend closely underneath the gutter of the rim, there is no danger of the lugs becoming so locked or wedged in cocked position that they cannot effectively secure the rim in place or be conveniently removed. In the illustrated embodiment, the eccentricity of the clamping force, which exists in most lugs, is counteracted by a force couple, one force of which acts where the laterally outer portion of the lug seats on the shoulders on the spoke end and the other force acts where the lip 33 engages under the rim gutter. While I have shown a T-shaped lug for this purpose with the clamping bolt engaging the shank thereof and one portion of the head bearing directly against the wheel body, out of the plane of the portion of the lug which engages the rim, with the other portion of the head engaged under the rim, obviously other means may be employed to prevent the lug from tilting or cocking angularly to any material extent so that the cramping force never becomes great enough to prevent the sliding of the lug on the wheel body.

Rims of this type are frequently provided with thrust lugs 41 and 42 which are adapted to engage the spokes of the spider to impart driving thrust from the spider to the rim independently of the clamping connection. These lugs 41 and 42 will engage the outside surfaces of the spoke end and consequently will directly impart this thrust to the rim.

In certain instances it may be advantageous to arrange the spoke ends so that the innermost surface of the gutter will engage shoulders on the spoke when the rim is first put upon the wheel, thereby preliminarily aligning the rim with respect to the spider. In Figure 7 I have shown a spoke end of this type. As will be apparent, the general construction of the spoke end is the same with the exception that the shoulder 50 is disposed at a greater radial distance from the center of the hub than the corresponding shoulders in the preferred embodiment, and is arranged so that the innermost surface 51 of the gutter of the rim has but slight clearance from the shoulder 50 when the rim is placed upon the wheel. The clamping bevel 52 engages the bevel surface 53 of the gutter as before, this bevel 52 being disposed at the same distance from the axis of the hub as in the preferred embodiment.

The clamping lug used in one arrangement of this kind is substantially like that previously explained except that the seating surfaces 54 and 58, Figure 8, are located at a greater distance from the center of the hole 59 in the ear 60, this distance corresponding to the added height of the shoulder 50. The cylindrical section 61 is shorter and extends only from side to side of the socket 62 in the spoke end. This cylindrical lip 61 passes under but does not engage the innermost surface 51 of the rim, and is provided for the purpose of preventing the lug from turning about an axis disposed at right angles to the axis of the bolt 63 when the nut 64 is tightened.

The lug is provided with the planar clamping surface 65 which engages the outside edge of the rim to press the rim securely against the clamping bevel 52 on the spoke end.

In many instances it will prove advantageous to have the clamping bevels such as 52 and 10 loosely mounted upon the spoke. Such an arrangement permits the mounting of a single tire upon a spider whose spoke ends are machined for mounting for dual rims, and will also permit the mounting of rims having various types of gutters upon a given spider. To accomplish this latter purpose, the removable clamping bevels are provided with angular surfaces designed to register with the angular surfaces of the particular gutter.

In Figure 5 I have shown a cross sectional view of a spider so equipped. In this figure, the spoke 70 will be recognized as a spoke equipped for the mounting of dual rims, this spoke having the shoulders 71 and 72 separated by a raised central wall portion or abutment 73 which is equipped with an aligning shoulder 74. The removable aligning member 75 is shown in detail in Figure 6. This lug or clamping member is provided with arcuate surfaces 76 and 77 which are adapted to fit upon the shoulders 71 lying on a cylinder whose center coincides with the axis of the spider. The lug is also provided with a planar surface 78 which is adapted to register against the shoulder 74 on the spider. The beveled clamping surfaces 79 and 80 are positioned at a definite angle with respect to the plane of the surfaces 76 and 77, that angle corresponding to the angle of the gutter of the rim that is to be mounted upon the spider, and will of course be varied to register with the gutter. These surfaces 79 and 80 are located at a fixed distance from the surface 78 so that when this latter surface is pressed firmly against the shoulder 74 on the spider the clamping bevels will be located at the proper points upon the spoke ends.

The clamping member is also provided with a depending ear 81 which is pierced at 82 to receive the through bolt, this ear being adapted to project into the socket formed in the end of the spoke between its side walls.

The upper surface 83 of the clamping member is formed arcuate, so that it will lie upon a cylinder whose center coincides with the axis of the hub when the member is properly positioned upon the spider, this cylinder having a diameter slightly less than the diameter of the web 84 of the rim.

The through bolt employed to clamp a single rim upon a dual wheel is a short bolt 85 having a head 86 adapted to register against the mid wall 87 of the spider, this wall being provided with a projection 88 against which the cut away portion 89 of the head registers to prevent turning of the bolt. The clamping lug 75 is placed over this bolt and held in position thereon by any suitable means such as the cotter pin 90 so that it will not readily become detached when the rim is removed.

The manner of placing the rim upon the wheel is obvious, the gutter 91 being brought into such a position that it loosely registers with the clamping bevels 79 and 80 on the clamping member. The clamping lug 92 employed in this embodiment of my invention is identical with the lug previously described, and is provided with the cylindrical lip 93 which engages the innermost surface 94 of the rim to preliminarily align the rim upon the wheel. The lug also is provided with a planar surface 95 by which the rim is pressed inwardly on the wheel. The engagement of the tapered surface of the gutter 91 with the bevels 79 and 80 definitely aligns the rim with respect to the clamping lug and consequently with respect to the spider, as the nut 96 is tightened.

Obviously the removable clamping member 75 may be employed in a wheel designed for the mounting of a single rim as well as with a wheel designed for the mounting of dual rims as shown. In the embodiment of the invention shown in Figure 2, the wall 7 is made correspondingly shorter and the shoulder 9 is extended to receive the surfaces 76 and 77 to permit the use of this type of a clamping bevel with the particular spider.

From the foregoing it will be apparent that my invention permits the accurate aligning of the rim with respect to the spider, within commercial limits, without particular manipulation on the part of the operator. Ample clearances are provided so that the rim will readily fit over the spider and the aligning is accomplished in two steps, that is, a preliminary step which is brought about by either the engagement of the cylindrical lip on the clamping lug with the gutter of the rim or by the engagement of the gutter with the shoulder on the spoke. The final alignment in either case is accomplished by means of engagement of the clamping bevel surfaces with the beveled edge of the gutter, and this draws the rim into accurate alignment with the spider in the ordinary course of manipulation of the tightening of the nut. The maximum amount of misalignment that is possible in the arrangement of my invention is small since the shoulders and lips employed to preliminarily align the rim on the spider also cooperate to limit the maximum amount of misalignment that can occur. The clearance between these shoulders and lips and the rim is small and consequently this maximum amount of misalignment is correspondingly small.

While I have chosen to show my invention by illustrating a preferred embodiment of it, I have done so by way of example only as there are many modifications and adaptations which can be made by one skilled in the art without departing from the teachings of the invention.

What I consider new and desire to have protected by Letters Patent is pointed out in the appended claims.

What is claimed is:

1. A wheel body having a plurality of spokes, each of said spokes terminating in a pair of flat shoulders disposed on opposite sides of a radially outwardly opening transverse socket and lying on a cylinder whose axis coincides with the axis of the wheel body, a pair of clamping bevels on each spoke adjacent to and spaced radially outward from said shoulders on opposite sides of said socket, and means for holding a through bolt in said socket between said shoulders.

2. A clamping lug comprising an arcuate body, a centrally disposed perforated ear extending radially inwardly from said body, a planar clamping surface disposed parallel to the plane of said ear, and a pair of cylindrical seating surfaces disposed one on each side of and separated by said perforated ear and having the elements thereof normal to said clamping surface.

3. A wheel body having shouldered spoke ends, clamping bevels seated on said spoke ends against the shoulders thereof, a rim having a beveled gutter adapted to register with said bevels, clamping lugs slidably mounted on the spoke ends and registering with said spoke ends and rim gutter, and bolts extending through said spokes, bevels and lugs to clamp those members and the rim securely to the wheel body.

4. The combination with a wheel body having sockets formed in its spoke ends by the shouldered side walls of the spokes, of clamping members seated on said shoulders and having perforated ears projecting into said sockets, a rim disposed around said wheel body, a gutter on said rim registering with said clamping members, clamping lugs resting on said shoulders and against said rims, perforated ears on said lugs projecting into said sockets, and bolts extending through both sets of said ears to clamp said lugs, rim and clamping members onto the wheel body.

5. The combination with a wheel body having sockets formed in its spoke ends by the shouldered side walls of the spokes, of clamping members seated on said shoulders and having perforated ears projecting into said sockets, a rim disposed around said wheel body, a gutter on said rim registering with said clamping members, clamping lugs resting on said shoulders and against said rims, arcuate projections on said lugs projecting under said rim to preliminarily align it on said wheel body, perforated ears on said lugs projecting into said sockets, and bolts extending through both sets of said ears to move said lugs against the rim and the rim against said clamping members to thereby secure and align said rim on said wheel body.

6. Means for mounting a single rim on a shouldered dual wheel body which comprises the combination of a T-shaped clamping member having a planar face adapted to register with the shoulders on the wheel body, a clamping bevel formed on said member, a clamping lug, and a bolt for drawing said lug toward said member and for holding the two on the wheel body.

7. Means for mounting a single rim on a dual wheel body having shoulders which comprises the combination of a T-shaped clamping member having a planar face adapted to register with the shoulders on the wheel body, a clamping bevel formed on said member, a T-shaped clamping lug, and a bolt for drawing said lug toward said member and for holding the two on the wheel body.

8. Means for mounting a single rim on a dual wheel body having shoulders which comprises the combination of a clamping member having a planar face adapted to register with said shoulders, a taper seating face and a perforated ear projecting from said planar face, a clamping lug having a planar surface for engaging the rim and a second planar surface for engaging said shoulder, and a bolt for drawing said lug toward said member and for holding the two on the wheel body.

9. In a wheel, a spoke radiating from a hub, a rim having a web, the radius of said web being slightly greater than the length of said spoke, a gutter on said rim projecting inwardly from said web, a taper shoulder on said spoke registering with said gutter, a cylindrical shoulder on said spoke substantially equal to the inner radius of said gutter, a bolt projecting through said spoke and disposed radially inwardly of said cylindrical shoulder, and a lug having a portion resting on said cylindrical shoulder and a portion disposed radially inwardly thereof adapted to engage and be moved longitudinally of said bolt to engage said gutter and press it against said taper to thereby clamp the rim on said spoke.

10. A wheel comprising, in combination, a wheel body, radially outwardly facing transversely extending shoulders forming seats provided on the periphery of said wheel body, means forming beveled surfaces adjacent said shoulders, a rim having a gutter adapted to be positioned on said beveled surfaces, and lug means having seating surfaces slidable on said seats and rim contacting means disposed laterally inwardly of the outermost portions of said cooperating shoulders and seating surfaces, said rim contacting means being adapted to engage said rim with the laterally outer portions of said seating surfaces reacting against the laterally outermost portions of the shoulders to force the gutter thereof into wedging engagement with the beveled surfaces on the wheel body.

11. A wheel comprising, in combination, a wheel body, seats on the periphery of said wheel body, means forming beveled surfaces adjacent said seats, a rim having a tire receiving channel and a gutter adjacent one edge thereof adapted to be positioned on said surfaces, and lug means slidable on said seats and adapted to engage the gutter of the rim laterally inwardly of the contact between the lug means and said seats to force the rim into wedging engagement with said beveled surfaces.

12. A wheel comprising, in combination, a wheel body, seats on the periphery of said wheel body, means forming a single peripheral series of beveled surfaces disposed in contiguous relation to said seats, a rim having a tire receiving channel and a gutter adjacent one edge thereof adapted to be positioned on said surfaces, and lug means slidable on said seats and each having a cylindrical surface and rim contacting portions, the cylindrical surfaces being adapted to engage the radially inner portions of the rim to initially center the rim with respect to the axis of the wheel body and the rim contacting portions being adapted to engage the edge of the gutter to force the same into wedging engagement with said beveled surfaces.

13. A felloeless wheel comprising, in combination, a wheel body having a hub and spokes radiating therefrom, seats on the radially outer ends of the spokes, means forming beveled surfaces adjacent the seats, a rim having a gutter positioned on said beveled surfaces, lug means each having a seating surface, a cylindrical surface and a planar surface, the cylindrical surface being adapted to engage the radially inner portions of the gutter to initially center the rim with respect to the axis of the wheel body, the planar surfaces being disposed laterally outwardly of the cylindrical surface and adapted to engage the edge of the gutter to force the rim into wedging engagement with the beveled surfaces at the ends of the spokes and the seating surface extending laterally outwardly of the planar surface and adapted to engage the seats formed on the outer ends of the spokes and cooperating with the cylindrical surface to prevent overturning of the lug means when the same is tightened, and means for sliding said lug means along the seats to secure the rim on said beveled surfaces.

14. A wheel comprising, in combination, a wheel body, radially outwardly facing shoulders forming seats provided on the periphery of said wheel body, means forming rim receiving surfaces adjacent said shoulders, a rim adapted to seat on said means, a lug having a rim engaging portion and portions disposed laterally outwardly of the rim engaging portions and slidably engaging the seats on the shoulders to resist the reactions due to clamping, and means for moving the lug on said seats to clamp the rim against said rim receiving surfaces.

15. A wheel comprising, in combination, a wheel body, radially outwardly facing shoulders forming pairs of seats provided on the periphery of said wheel body with a socket between the seats of each pair of seats, a rim having a tapered section at one edge thereof and adapted to be mounted on the wheel body, means spaced radially outwardly of said shoulders to receive said tapered section to take the reaction of said rim, lug means each having a rim engaging portion adapted to engage said edge of the rim, portions slidably engaging the seats on the shoulders and an apertured ear received in the socket between the seats of each pair, and means extending through said ear and said socket to move each lug means on said seats to clamp the rim with the tapered section seated against said rim reaction receiving means.

16. A wheel comprising a wheel body having outwardly facing shoulders at the periphery thereof, said shoulders being positioned on a cylinder whose axis coincides with the axis of the wheel body, means on the wheel body forming beveled surfaces adjacent said shoulders, a rim having a beveled gutter at one side thereof adapted to register with said beveled surfaces, clamping lugs having cylindrical seating surfaces contacting with and slidable along said shoulders axially of the wheel body and clamping surfaces adapted to contact with the edge of the rim adjacent said gutter and to urge the latter in an axial direction to wedge the beveled gutter against said beveled surfaces on the periphery of the wheel body, and bolts extended through at least a portion of the wheel body and engaging said lugs to shift the latter along said shoulders, the cylindrical seating surfaces on the lugs reacting against the outwardly facing shoulders on the wheel body to relieve the bolts of the clamping reactions.

17. A wheel comprising a wheel body having radially outwardly facing shoulders thereon disposed in a cylindrical surface whose axis coincides with the axis of the wheel body and beveled surfaces adjacent said shoulders, a rim having a cooperating beveled surface adapted to seat against the beveled surfaces on the wheel body, clamping lugs slidably mounted on said cylindrical shoulders and having portions disposed radially outwardly for contacting with the marginal edge of said rim to urge the latter axially of the wheel body against the beveled surfaces thereon, portions engageable with the radially inner side of the edge of the rim, and portions engageable with said shoulders laterally outwardly of said first portions, and means for moving said lugs along said shoulders, the reactions due to the clamping of the lugs being resisted by the laterally outer portions of the lugs bearing against the shoulders on the wheel body.

18. A wheel comprising a wheel body having radially outwardly facing shoulders formed thereon and beveled surfaces adjacent said shoulders, lugs slidably mounted on said shoulders for movement laterally inwardly and outwardly of the wheel body, said lugs having seating surfaces bearing against said shoulders, a rim having a beveled surface adapted to register with the beveled surfaces on the wheel body, each of said lugs having a radially upstanding portion disposed laterally inwardly with respect to the seating surfaces thereon which are adapted to contact with the shoulders on the wheel body, said upstanding portion being adapted to contact with the marginal edge of said rim to force the latter against said beveled surfaces, and clamping bolts adapted to forcibly move said lugs along said shoulders and to bring said upstanding portion of the lugs into contact with the marginal edge of said rim, the reactions due to clamping being taken by the seating surfaces of the lugs bearing against the shoulders on the wheel body laterally outwardly with respect to the points of contact between the lugs and the marginal edge of the rim.

19. A wheel comprising a wheel body, beveled seats disposed on the wheel body, shoulders adjacent thereto, a rim having a gutter adapted to fit against said seats, and means for drawing the rim against said seats to align the rim upon said wheel body, said means including clamping lugs having seating surfaces adapted to be received upon and to react against said shoulders, said lugs also having cylindrical preliminary aligning lips disposed laterally inwardly of the lugs and rim contacting portions intermediate the seating surfaces and the aligning lips.

20. A felloeless wheel comprising, in combination, a wheel body having a hub and spokes radiating therefrom, seats on the radially outer ends of the spokes, means forming beveled surfaces adjacent the seats on the wheel body, a rim having a gutter positioned on said beveled surfaces, lug means each having a seating surface, a cylindrical surface and a planar surface, the cylindrical surface being adapted to engage the radially inner portions of the gutter to initially center the rim with respect to the axis of the wheel body, the planar surface being disposed laterally outwardly of the cylindrical surface and adapted to engage the edge of the gutter to force the rim into wedging engagement with the beveled surfaces at the ends of the spokes, and the seating surface extending laterally outwardly of the planar surface and adapted to engage the seats formed on the outer edges of the spokes and cooperating with the cylindrical surface to prevent overturning of the lug means when the same is tightened, and means for sliding said lug means along the seats to secure the rim on said beveled surfaces.

21. A wheel comprising a wheel body having rim receiving means thereon, a rim adapted to be seated on said means, a lug adapted to secure the rim on said wheel body and including a rim contacting portion, one part thereof being adapted to engage the edge of the rim and another part thereof being adapted to engage underneath said rim, and a wheel contacting portion spaced laterally outwardly of said last named part, and clamping means for forcing said lug against said laterally outwardly spaced rim, said wheel contacting portion of the lug and said last named part reacting, respectively, against the wheel and the rim to establish an effective force couple tending to prevent material angular displacement of the lug relative to the wheel and the rim to prevent cocking of the lug therebetween.

22. A wheel comprising a wheel body, rim receiving means thereon, a wheel rim adapted to be seated on said means, a lug adapted to secure the rim on the wheel body, including a rim contacting portion and a wheel contacting portion, means for applying a clamping force to said lug to clamp the same against the rim and the rim against said rim receiving means on the wheel body, said wheel contacting means being disposed laterally outwardly of the point of application of said clamping force to said lug, and means cooperating with said wheel contacting portion of the lug to prevent angular displacement of the lug under the action of said clamping force, said last named means establishing in connection with the wheel contacting lug portion a force couple tending to oppose angular displacement of the lug under the action of the aforesaid clamping force.

23. A wheel comprising, in combination, a wheel body, seats on the periphery of said wheel body, means forming a single peripheral series of beveled surfaces disposed in contiguous relation to said seats, a rim having a tire receiving channel and a gutter adjacent one edge thereof, the latter being adapted to be positioned on said beveled surfaces, and a plurality of lugs slidable on said seats, each lug having a rim contacting portion adapted to engage the edge of the gutter and to exert a substantially axially directed force to shift the rim gutter into wedging contact with said beveled surfaces, and a seat contacting portion disposed laterally outwardly of said rim contacting portion.

24. A wheel comprising a wheel body having radially outwardly facing shoulders at the periphery thereof, means on the wheel body forming beveled surfaces adjacent said shoulders, a rim having a beveled portion adapted to register with said beveled surfaces, said shoulders extending laterally outwardly beyond said beveled portion, clamping lugs having seating surfaces engageable with said shoulders laterally outwardly of the beveled portion of the rim, said lugs also having portions in which the beveled portion of said rim is adapted to seat in non-wedging relation and providing for limited angular movement of the clamping lugs with respect to said rim, radially inwardly extending ears on said clamping lugs, and bolt means extended through at least a portion of the wheel body and engaging the ears of said lugs to shift the latter laterally inwardly along said shoulders, said lugs reacting at their laterally outer portions against said shoulders and tending to follow the rim as the latter is moved radially outwardly and laterally by the tightening of said bolt means.

25. A wheel comprising a wheel body having radially outwardly facing shoulders at the periphery thereof, means on the wheel body forming beveled surfaces adjacent said shoulders, a rim having a beveled portion adapted to register with said beveled surfaces, said shoulders extending laterally outwardly beyond said beveled portion, clamping lugs having seating surfaces engageable with said shoulders laterally outwardly of the beveled portion of the rim, said lugs also having curved portions in which the beveled portion of the rim is cradled, the curved portions of said lugs terminating in portions adapted to engage the outermost edge portion of the rim adjacent the beveled portion thereof so as to exert an axially directed force thereon, the lugs also having heel portions contacting with the shoulders on the wheel body laterally outwardly of the beveled portion of the rim and the contact between that portion and the curved portion of the lugs, bolt means for said lugs, tightening of the bolt means causing the lugs to react at their heel portions against the shoulders and to move bodily with the rim as the latter is shifted laterally on the wheel body and radially outwardly thereof.

26. A wheel comprising a wheel body having outwardly facing shoulders at the periphery thereof, means on the wheel body forming beveled surfaces disposed in a plane laterally inwardly of said shoulders, a rim having a beveled portion adapted to be mounted adjacent said beveled surfaces, clamping lugs having seating surfaces adapted to engage the beveled portion on the rim, the seating surfaces of the lugs terminating in portions adapted to engage the outermost edge portion of the rim adjacent the beveled portion thereof so as to exert an axially directed force thereon and to move bodily therewith, the center of contact between the seating surface on each clamping lug and the beveled portion of the rim being disposed laterally inwardly of the center of area of said shoulders, said lugs having portions adapted to seat against said shoulders, and means for drawing the lugs laterally on the wheel body against the rim, said lugs reacting against said shoulders to force the rim laterally and radially outwardly with respect to the wheel body.

27. A wheel body having shouldered spoke ends, clamping bevels seated on said spoke ends against the shoulders and a rim having a beveled gutter adapted to register with said bevels, clamping lugs slidably mounted on the spoke ends and registering with said spoke ends and rim gutter, means to hold said clamping bevels on said spoke ends, and clamping means associated with said lugs for securing the rim to the wheel body.

28. A wheel comprising, in combination, a wheel body, seats on the periphery of said wheel body, means forming beveled surfaces adjacent said seats, a rim having a tire receiving channel and a gutter adjacent one edge thereof adapted to be positioned over said surfaces, and lug means slidable on said seats and adapted to engage the gutter of the rim laterally inwardly of the contact between the lug means and said seats to secure the rim on the wheel body.

29. A wheel comprising a wheel body, a rim adapted to be mounted on said wheel body, a lug adapted to secure the rim on said wheel body and including a rim contacting portion, one part thereof being adapted to engage the edge of the rim and another part thereof being adapted to engage underneath said rim, and a wheel contacting portion spaced laterally outwardly of said last named part, and clamping means for forcing said lug against said rim, said laterally outwardly spaced wheel contacting portion of the lug and said last named part reacting, respectively, against the wheel and the rim to establish an effective force couple tending to prevent material angular displacement of the lug relative to the wheel and the rim to prevent cocking of the lug therebetween.

30. The combination, with the spoke end of a wheel having a lateral outwardly opening socket defined by parallel spaced laterally extending walls having radially outwardly extending abutment shoulders thereon, of a rim seating member having an arcuate beveled rim seating portion, a radially extending inner face engaging said shoulders, and a depending shank extending into said socket and having an opening adapted to receive a clamping bolt.

31. In combination, a wheel body having a spoke end provided with a lateral outwardly opening socket defined by parallel spaced laterally extending walls having radially outwardly extending abutment shoulders thereon, a tire rim having an internally beveled gutter, and means for clamping said rim on said spoke end comprising a T-shaped adaptor member having an arcuate beveled outer surface receiving said gutter, a depending shank extending into said socket, a radial inner face engaging said shoulders, and laterally disposed cylindrical surfaces on opposite sides of said shank and seating on said walls for transmitting the thrust of said rim through said adaptor to said spoke end.

32. Means for supporting an edge-mounted internally beveled tire rim on the spoke ends of a wheel body, each of said spoke ends having a transverse outwardly opening socket defined by parallel spaced lateral shoulders having radially outwardly extending abutment surfaces at the lateral inner ends thereof, comprising a T-shaped lug member having a radial inner face engaging said shoulders, an arcuate outer surface having a beveled portion receiving said beveled portion of said rim, and laterally spaced bearing portions extending normal to said inner face and engaging said shoulders for transmitting the thrust of said rim through said member to said spoke end.

33. Means for mounting an internally beveled gutter type tire rim on the spoke ends of a wheel body, each spoke end having a transverse outwardly opening socket defined by parallel spaced lateral shoulders having radially outwardly extending abutment surfaces, comprising an adaptor member having an arcuate outer beveled surface receiving the beveled gutter of said rim, a depending shank on said member extending into said socket, laterally spaced bearing portions on said member seating on said shoulders and a radial inner face engaging said abutment surfaces, a clamping lug having a rim alining portion and a normally extending rim engaging portion for moving said rim into wedging engagement with said adaptor member, a depending shank on said lug, a clamping bolt extending through said shanks and having means for moving said clamping lug axially inwardly of said socket.

34. An adaptor member for supporting a beveled gutter type rim on the spoke end of a wheel body comprising a T-shaped lug provided with an arcuate outer surface having a beveled portion receiving said rim, and a radially depending shank, and bearing portions spaced on opposite sides of said shank and extending laterally outwardly toward the thin edge of said beveled portion for engaging said spoke end to transmit the thrust of said rim thereto.

35. Means for supporting and clamping a beveled gutter type tire rim on the spoke end of a wheel body comprising an adaptor member having an arcuate beveled outer surface receiving said rim and supported against rotation or relative lateral inward movement with respect to said spoke end, a clamping lug having an arcuate rim alining surface and a normally extending radial surface engaging the lateral edge of said rim for forcing said rim inwardly onto said adaptor member, a bolt extending transversely of said spoke end and having means engaging said lug for drawing said lug laterally inwardly of said spoke end to wedge said rim in position on said adaptor member.

FREDERICK W. BURGER.